(12) United States Patent
Scott et al.

(10) Patent No.: US 6,971,223 B2
(45) Date of Patent: Dec. 6, 2005

(54) WHEELED TRIMMER DEVICE OF ADJUSTABLE HEIGHT

(75) Inventors: Mike Scott, Dublin, GA (US); Doug Johnson, Cramerton, NC (US); Deborah Faircloth, Dublin, GA (US); Ben Knight, Helena, GA (US)

(73) Assignee: Electrolux Home Products, Inc., Cleveland, OH (US)

( * ) Notice: Subject to any disclaimer, the term of this patent is extended or adjusted under 35 U.S.C. 154(b) by 159 days.

(21) Appl. No.: 10/056,216

(22) Filed: Jan. 25, 2002

(65) Prior Publication Data

US 2002/0157368 A1 Oct. 31, 2002

Related U.S. Application Data

(60) Provisional application No. 60/325,751, filed on Jan. 25, 2001.

(51) Int. Cl.[7] ............................................. A01D 34/00
(52) U.S. Cl. ......................................... 56/12.7; 30/276
(58) Field of Search ........................ 56/12.7, 255, 295, 56/16.7, 17.5; 30/276, 329, 342

(56) References Cited

U.S. PATENT DOCUMENTS

| | | |
|---|---|---|
| 2,329,185 A | 9/1943 | Coddington |
| 2,669,826 A | 2/1954 | Watrous |
| 3,093,948 A | 6/1963 | Root |
| 3,114,229 A | 12/1963 | Wilson |
| 3,247,654 A | 4/1966 | Nemeth et al. |
| 3,443,784 A * | 5/1969 | Walkinshaw ............ 248/408 |
| 4,077,191 A | 3/1978 | Pittinger, Sr. et al. |
| 4,091,536 A | 5/1978 | Bartholomew |
| 4,134,204 A | 1/1979 | Perdue |
| 4,151,646 A | 5/1979 | Lane |
| 4,161,820 A | 7/1979 | Moore |
| 4,168,572 A | 9/1979 | Ewing |
| 4,169,311 A | 10/1979 | Evenson et al. |
| 4,182,100 A | 1/1980 | Letter |
| 4,183,138 A | 1/1980 | Mitchell et al. |
| 4,195,408 A | 4/1980 | Palmieri et al. |
| 4,209,902 A | 7/1980 | Moore et al. |
| 4,211,005 A | 7/1980 | Woods |
| 4,347,666 A | 9/1982 | Moore |
| 4,476,632 A | 10/1984 | Proulx |
| 4,561,180 A | 12/1985 | Pittinger, Sr. et al. |
| 4,667,410 A | 5/1987 | Weid et al. |
| 4,688,376 A | 8/1987 | Wolfe, Sr. |
| 4,703,613 A | 11/1987 | Raymond |
| 4,731,981 A | 3/1988 | Geringer |
| 4,813,140 A | 3/1989 | Calcinai |
| 4,817,288 A | 4/1989 | Hirose et al. |
| 4,882,843 A | 11/1989 | Baba |
| 4,891,931 A | 1/1990 | Holland |
| 4,909,024 A | 3/1990 | Jones et al. |
| 4,922,694 A | 5/1990 | Emoto |
| 5,092,112 A | 3/1992 | Buckendorf, Jr. |
| 5,095,687 A | 3/1992 | Andrew et al. |
| 5,095,688 A | 3/1992 | Fabrizio |

(Continued)

Primary Examiner—Árpád Fábián Kovács
(74) Attorney, Agent, or Firm—Marc A. Hubbard; Munsch Hardt Kopf & Harr, P.C.

(57) ABSTRACT

A wheeled vegetation trimmer with an adjustable height cutting element includes an adjuster member having a locking plate for positioning the adjuster assembly along a length of the shaft by selectively engaging the locking plate with a desired slot on a spindle and a partial ball-shaped and freely spinning ground contacting member.

15 Claims, 3 Drawing Sheets

U.S. PATENT DOCUMENTS

| | | |
|---|---|---|
| 5,174,100 A | 12/1992 | Wassenberg |
| 5,222,750 A | 6/1993 | Ellis |
| 5,287,683 A | 2/1994 | Smith |
| 5,309,701 A | 5/1994 | McGuerty |
| 5,313,770 A | 5/1994 | Smothers |
| 5,408,816 A | 4/1995 | Cartier |
| 5,450,715 A | 9/1995 | Murray |
| 5,461,787 A | 10/1995 | Araki et al. |
| 5,577,374 A | 11/1996 | Huston |
| 5,623,765 A | 4/1997 | Ner-Gaon |
| 5,862,655 A | 1/1999 | Altamirano et al. |
| 5,881,464 A | 3/1999 | Collins et al. |
| 5,881,465 A | 3/1999 | Brant et al. |
| 5,906,051 A | 5/1999 | Nannen |
| 6,052,974 A * | 4/2000 | Harb .......................... 56/12.7 |
| 6,666,009 B1 * | 12/2003 | Brandon ..................... 56/12.7 |

* cited by examiner

WHEELED TRIMMER DEVICE OF ADJUSTABLE HEIGHT

RELATED APPLICATION

This application claims priority to U.S. Provisional Application No. 60/325,751 filed Jan. 25, 2001 entitled, "Wheeled Vegetation Trimmer".

TECHNICAL FIELD OF THE INVENTION

The present invention relates generally vegetation trimmers.

BACKGROUND OF THE INVENTION

Flexible line or string trimmers are well-known and widely used devices for cutting vegetation, such as grass. The cutting element of such trimmers is a length of flexible line or string, typically a monofilament polymer, that is flailed against the vegetation by rapidly spinning the line with a motor. Other types of flails can be used, including flexible line made of, for example, braided metal, and pivoting blades made of, for example, plastic. Polymer monofilament line is probably the most widely used. It is strong enough to cut relatively soft vegetation. Yet, it tends to yield or break when flailed against harder or tougher objects such as woody stemmed plants, trees or structures, thus reducing the tendency to damage such objects. It is therefore well suited for trimming grass and other vegetation adjacent to trees, sidewalks and houses, where a steel element or blade or other type of cutting element may cause damage or be damaged during normal use.

The most common types of flexible line trimmers are manually carried by an operator so that they may be easily maneuvered. However, many and various types of trimmers with wheels have been suggested or used. In one example, a set of wheels is mounted near the rear of a frame, with the center of gravity of a motor being positioned so that weight of the motor in at least partially balancing the weight of the portion of the trimmer forward of the wheels. A belt or chain drive transmits power from the motor to a drive shaft mounted near the front of the frame, forward of the wheels. A rotating spindle, which has an axis oriented more or less perpendicularly to the ground during normal operation of the device, rotates a cutting element or head. In normal operation, an operator maneuvers the trimmer by means of a handle that extends from the rear of the frame. When not in use, the trimmer rests on the two wheels and the spindle. With such a configuration, the trimmer can be easily rotated about the wheels in order to lift or lower the cutting head, or turned from side-to-side to maneuver or position the cutting head. An example of this type of trimmer is shown in U.S. Pat. No. 5,862,655.

SUMMARY OF THE INVENTION

The invention, as defined by the appended claims, is directed to an improved wheeled vegetation trimmer or mower. The invention and its advantageous are disclosed below in context of a detailed description of a representative example of a wheeled trimmer embodying the invention.

Briefly summarized, the wheeled trimmer has a frame carried by a set of wheels disposed near the rear of the frame. A motor or other rotary power source is mounted on the frame. The power source drives a rotating spindle mounted near the front of the frame. The spindle extends downwardly from the frame.

A freely-rotating ground engaging member is disposed on one end of the spindle, which permits the spindle to rotate independently of the ground engaging member. Kick caused by a rotating member touching the ground and wear of the ground engaging member are reduced. The ground engaging member preferably has a semispherical or similar curved shape that tends to cause the spindle to deflect upwardly (and the trimmer to tilt back) when encountering a surface irregularity, object or other height variation as the trimmer is moved horizontally relative to the ground. The shape of the ground engaging member thus reduces tendency to catch as the trimmer being maneuvered. The trimmer may thus be operated more effectively with the ground engaging member against or very near the ground to achieve a uniform cut.

The representative example further include an adjustable height cutting element carrier mounted to the spindle, above the ground engaging member. A manually operable member easily releases the carrier in order to slide or move it up or down on the spindle. The position of the cutting element thus may be adjusted to adjust the cutting height cutting. The combination with the ground engaging member, with the cutting element carrier with easily adjustable height provides a wheeled trimmer improved trimming performance and usability.

Details of the exemplary wheeled trimmer and additional advantages of its construction and operation are described below, with reference to the accompanying drawings in which:

DETAILED DESCRIPTION OF THE DRAWINGS

Like numerals being used for like and also for corresponding parts of the various drawings.

Figure 1:
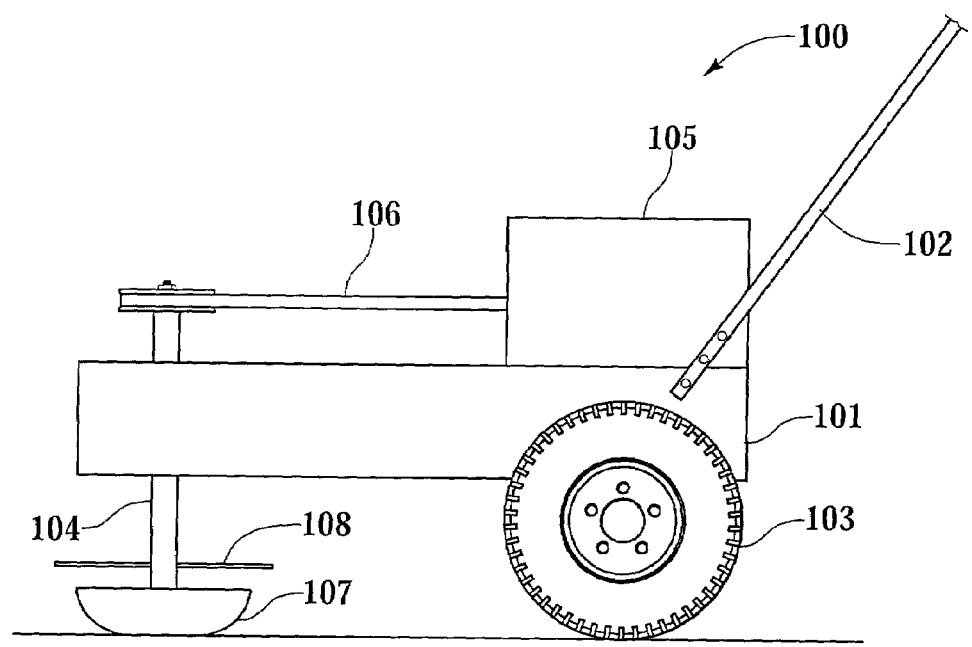
FIG. 1 is a schematic representation of a preferred embodiment wheeled trimmer device of the present invention.

Referring to FIG. 1, wheeled trimmer 100 includes a frame 101. A handle 102 secured to frame 101 near its rear portion so that the trimmer device can be maneuvered by a user standing behind the trimmer. A pair of wheels 103 is mounted to opposite sides of the frame near its rear portion. Spindle 104 depends downwardly from a front portion of platform 101. The spindle is a rotatable element, such as a shaft or axle, on which a cutting element is supported. The spindle has a generally vertical orientation with respect to the ground during normal operation. The length of the spindle is such that the frame 101 is generally horizontal to the ground during normal operation. Rotary power source or motor 105 delivers rotary power to the spindle assembly through transmission 106. The transmission may be a belt, chain or gear drive, or a rotating shaft. Disposed on the end of the spindle is ground contacting member 107. A cutting element, for example a flexible line or string 108, is connected to the spindle.

Although not shown in FIG. 1, the trimmer may include a cutting element carrier, to which a replaceable cutting element such as a string is attached. The cutting element carrier is preferably adjustably mounted to the spindle in a manner to permit the cutting element to move up or down on the spindle and locked to any one of a plurality of positions. A height adjustment mechanism for the carrier includes a locking member disposed on a frame for locking the carrier in place on the spindle, and thus fixing its height. The locking member is preferably manually releasable for easy adjustment without tools. The cutting element carrier is coupled to the frame to move in tandem up and down on the spindle. If desired, the frame and cutting element carrier may be integrated in a single element. The ground contacting member may be mounted to rotate independently of the spindle.

Figure 2:
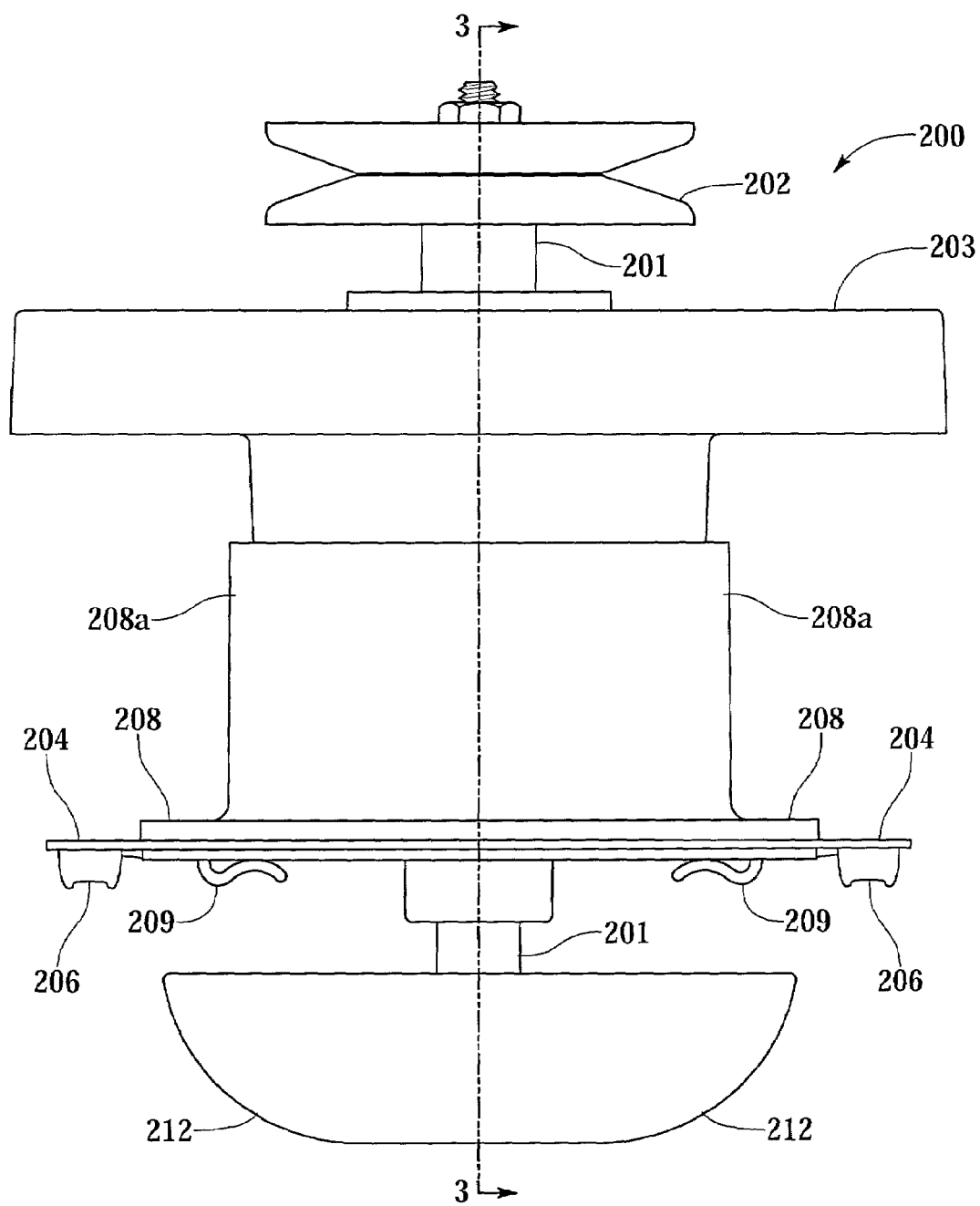
FIG. 2 is a pictorial view of a spindle assembly of the wheeled trimmer device of FIG. 1.
Figure 3:
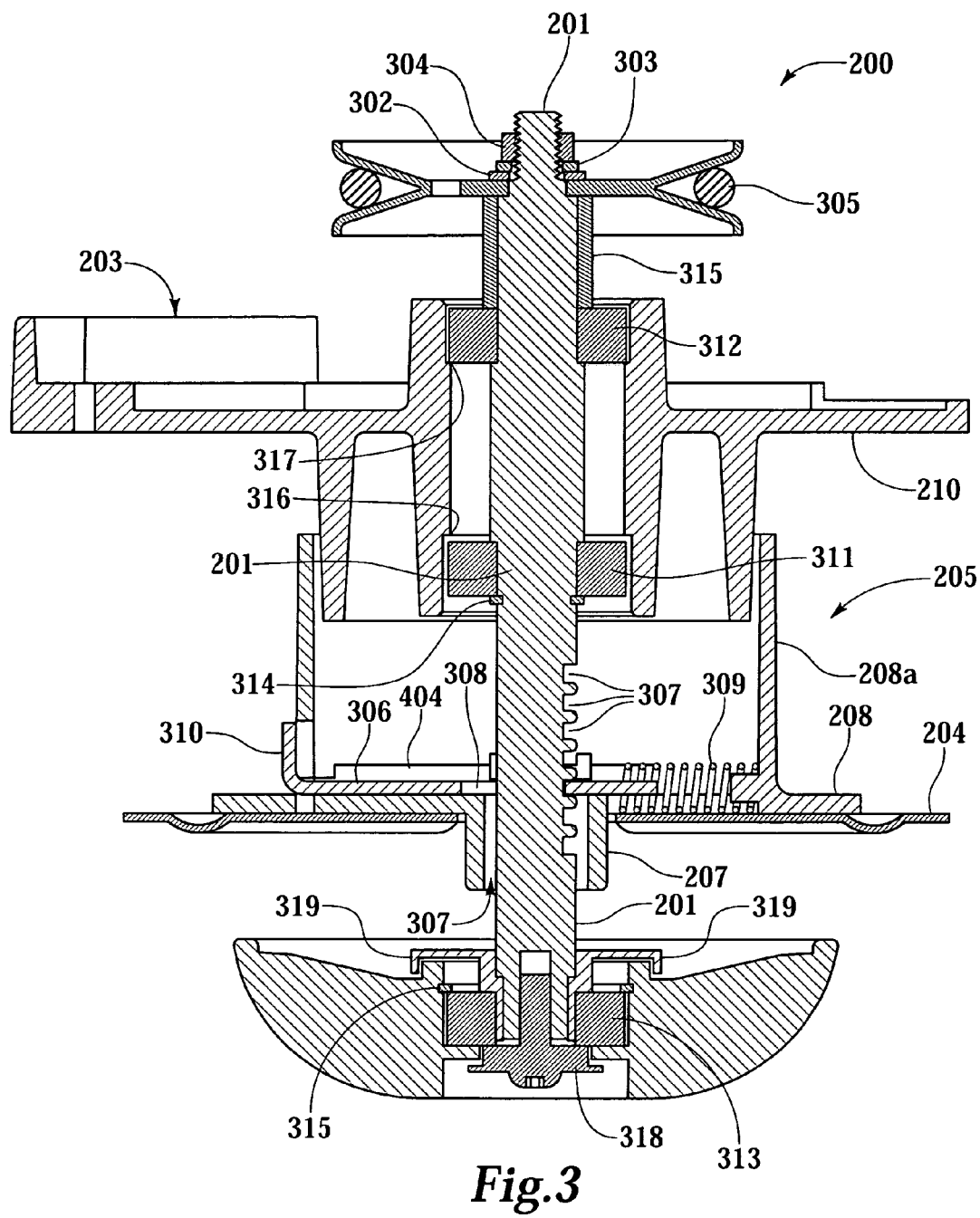
FIG. 3 is a sectional view of the spindle assembly of FIG. 2 taken along section 3—3 of FIG. 2.

Referring to FIGS. 2 and 3, spindle assembly 200 is a detailed example of a combination of a spindle and cutting element for a wheeled trimmer such as shown in FIG. 1. Spindle assembly 200 includes a spindle or jack shaft 201 that is mounted in spindle housing 203 for rotation about its axis. Shaft 201 is rotated by a belt-drive transmission. Although other types of transmissions may be employed, a belt drive is particularly advantageous on wheeled trimmers due to its relatively low cost and complexity and ease of maintenance, among other reasons. Drive pulley 202 is fastened to the upper end of shaft 201 by placing, for example, a flat washer 302 around shaft 201 on top of pulley 301. A lock washer 303 is placed on top of flat washer 302. Washers 302 and 303 and pulley 202 are secured into position by a nut 304. Pulley 202 is coupled by belt 305 to a pulley on the output drive shaft of a motor (not shown).

Spindle assembly 200 includes, as an adjustable cutting element carrier, a string carrier 204 mounted to an adjuster assembly 205 so that the carrier and adjuster assembly move along the shaft and rotate with the shaft in tandem. A length of cutting string (not shown) is held on the carrier 204 by threading it through each of the eyelets 206 on opposite sides of the carrier, around collar 207 of adjuster assembly frame 208 and under clips 209.

Figure 4:
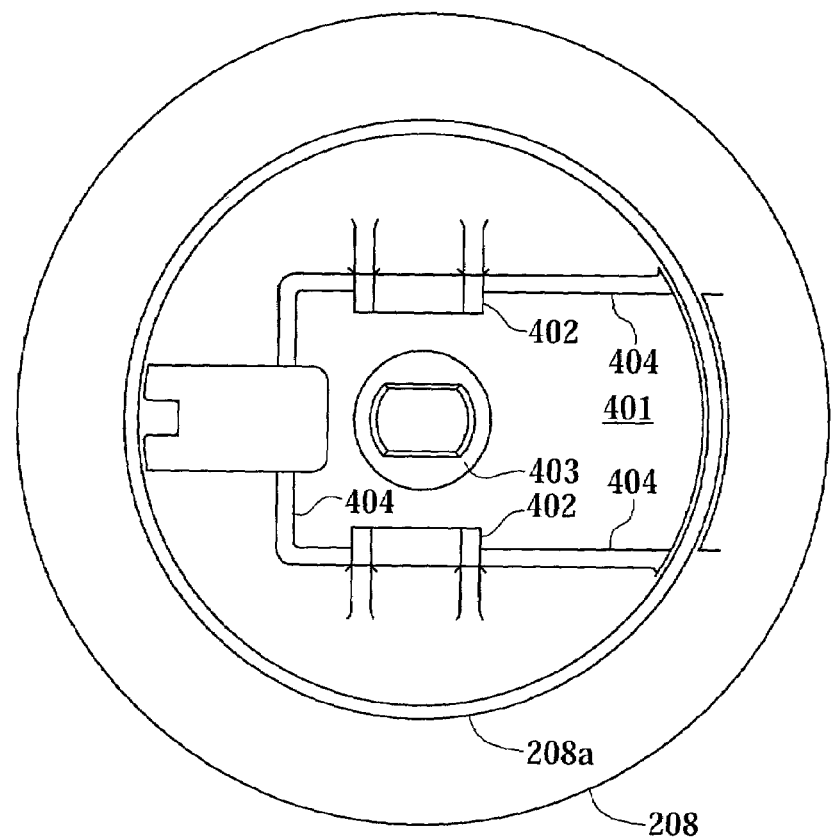
FIG. 4 is a top view of a frame for an adjuster assembly of the spindle housing of FIGS. 2 and 3.

Adjuster assembly 205, an example of a height adjustment mechanism for a cutting element carrier, selectively locks to any one of a plurality of positions along at least a portion of the length of shaft 201. Within frame 208 is supported a sliding plate 306 that functions as a locking member. The sliding plate is confined for movement within a channel 401 (FIG. 4), which is defined by walls 404. It is held within the channel by a set of tabs 402 (FIG. 4) extending from opposite sides over the channel and partially overlaying the sliding plate 306 (not shown in FIG. 4). The plate is thus constrained to slide laterally toward and away from shaft 201. Plate 306 may engage any one of a plurality of notches 307 formed along the side of shaft 201, and thereby lock the adjuster assembly against the movement along the axis or length of shaft 201 at one of a selected number of positions. Plate 306 includes an opening or slot 308, through which shaft 201 extends. Slot 308 permits plate 306 to move from an engaging position, in which one edge of the slot fits into one of the notches 307 to lock the plate, to a non-engaging position, in which there is no interference between the plate and shaft 201. Plate 306 is biased to an engaging or locking position by spring 309. Formed on the end of the plate is a button-like locking release member 310. The release member stands prow of a vertical, cylindrically-shaped wall 208a that extends upwardly from frame 208. When a user grips the adjuster assembly by placing his or her hand around the wall, the user may easily depress the release member with, for example, his or her thumb or hand. Depressing the release member inwardly moves plate 306 inwardly, thereby disengaging it from shaft 201 to permit the adjuster assembly to slide on shaft 201. Collar 207 keeps frame 208 properly oriented on the shaft, and may include a lining, such as made from a plastic insert 403 (shown only in FIG. 4), to facilitate centering and/or sliding of the collar on the shaft. The adjuster assembly is keyed to shaft 201 so that it rotates with the shaft. In the preferred embodiment, at least one side of the shaft is flattened to key against a straight side of slot 308 of locking plate 306. String carrier 204 is thus adjustably attached to shaft 201 and may be positioned at certain, selected positions along the vertical axis of shaft 201.

Spindle housing 203 holds a set of bearings 311 and 312 for shaft 201 within a collar portion 313. The bottom bearing 311 is held, on one side, by a first shoulder 316 formed inside the collar, and on the other side by a retaining ring 314 that cooperates with a retaining groove formed in shaft 201. The upper bearing 312 is held in place on one side by a second shoulder within collar 313 that faces a direction opposite that of the first shoulder 317. Pulley 202, which is held onto the shaft by nut 304, acts against the other side of the bearing through spacer 315. Thus, shoulders 316 and 317 effectively hold the shaft against axial movement with respect to the spindle housing 203. The spindle housing further includes an extended flange portion 210 that permits the entire spindle assembly to be mounted within an opening in the trimmer's frame (not shown) big enough to accommodate passage of the adjuster assembly 208 and string carrier 204 as the spindle assembly is dropped into the opening.

Spindle assembly 200 includes as a ground contacting member a ball-like member 212 having a roughly semi-spherical shape connected to the end shaft 201 in a manner that permits it to rotate or spin independently of shaft 201. The surface of the ground contacting member curves radially upwardly. With its curved surface, the ground contacting member presents a profile with respect to the ground that will tend to force the ground contacting member upwardly and over any relatively low profile obstruction on the ground, thus permitting the member to move freely along the ground without a tendency to hang or catch. Member 212 is coupled to the shaft through bearing 313. Retaining ring 314 is positioned on top of the bearing and cooperates with groove 315 to hold the bearing against a ledge formed around an opening through the center of member 212, thereby securing or connecting member 212 to the bearing. Screw 318 retains the bearing's inner race on the end of the shaft. Cover 319 shields the bearing.

While the invention has been particularly shown and described in context of a representative example of a wheeled trimmer, it will be understood by those skilled in the art that various other changes in form and detail may be made without departing from the spirit and scope of the invention as claimed.

What is claimed is:

1. A wheeled trimmer, comprising:
   a frame mounted on wheels;
   a motor mounted an the frame; and
   a spindle depending from the frame at a position forward of the motor, the spindle operatively coupled with the motor for receiving rotary power and including a carrier for a cutting element and a ground engaging member, the carrier rotating with the spindle and ground contacting member being mounted to an end of the spindle in a manner to permit rotation of the ground contacting member independently of the spindle, the carrier for a cutting element being adjustably mounted to the spindle for permitting the carrier to be moved along the spindle;

a locking member for selectively engaging the spindle to lack the carrier against axial movement along to the spindle and disengaging the spindle to permit axial movement of the carrier along the spindle; and a manually depressible member for causing the locking member to disengage from the spindle.

2. The wheeled trimmer device of claim 1, wherein the ground contacting member has a curved ground engaging surface.

3. The wheeled trimmer device of claim 2, wherein the curved ground engaging surface includes a portion having a generality semispherical shape.

4. The wheeled trimmer device of claim 1 further including a frame on which the locking member is mounted and to which the carrier is connected.

5. The wheeled trimmer of claim 1, wherein the locking member is biased to a locked position.

6. The wheeled trimmer of claim 1 wherein the locking member includes a sliding portion for selectively engaging any one of a plurality of slots to lock the carrier against axial movement.

7. A wheeled vegetation trimmer, comprising:
a frame having a set of wheels and a handle extending from a rear portion of the frame;
a motor mounted on the frame;
a spindle depending from the frame at a position forward of the motor, the spindle operatively coupled with the motor for receiving rotary power;
a carrier for a cutting element and the carrier rotating with the spindle;
a locking member for selectively engaging the spindle and thereby cooperating with the spindle to lock the carrier against axial movement along the spindle, and for disengaging the spindle to permit movement of the carrier along the spindle; and
a manually depressible member for causing the locking member to disengage from the spindle.

8. The wheeled vegetation trimmer of claim 7, wherein the locking member is biased toward engaging the spindle.

9. A wheeled vegetation trimmer, comprising:
a frame having a set of wheels and a handle extending from a rear portion of the frame;
a motor mounted on the frame;
a spindle depending from the frame at a position forward of the motor, the spindle operatively coupled with the motor for receiving rotary power;
a carrier for a cutting element and the carrier rotating with the spindle;
a locking member for selectively engaging the spindle and thereby cooperating with the spindle to lock the carrier against axial movement along the spindle, and for disengaging the spindle to permit movement of the carrier along the spindle; and
a frame on which the locking member is mounted for sliding toward and away from the spindle.

10. The wheeled vegetation trimmer of claim 9 further including a cylindrically shaped wall surrounding the spindle, through which extends a manually depressible member operatively connected for sliding the locking member out of engagement with the spindle.

11. The wheeled vegetation trimmer of claim 9, wherein the locking member includes plate with an elongated opening through which the spindle extends, one edge of the opening of the plate sliding into any one of a plurality of notches formed on the spindle when the lodging member engages the spindle, and out of any of the plurality of notches when the locking member disengages from the spindle.

12. A trimmer, comprising:
a rotary power source mounted a frame supported by wheels;
a spindle assembly depending from the frame, wherein said spindle assembly comprises,
a spindle shaft adapted to receive power from the rotary power source for rotation of the shaft, wherein said shaft includes a plurality of slots along an outer surface;
an adjuster assembly adjustably mounted on said shaft, wherein said adjuster assembly rotates with said shaft, and wherein said adjuster assembly comprises a locking plate for positioning said adjuster assembly along a length of said shaft by engaging said locking plate with a desired slot of said plurality of slots;
a string carrier attached to said adjuster assembly, wherein said string carrier includes a cutting line, and wherein by engaging said locking plate with a desired slot of said plurality of slots the distance of said cutting line from the ground can be adjusted, and
a ground contacting structure mounted to an end of said spindle shaft in a manner to permit independent rotation of said ground contacting member and said spindle shaft.

13. The trimmer of claim 12, further comprising a spring mechanism for biasing said locking plate toward engagement with one of the plurality of slots.

14. The trimmer of claim 12, wherein said ground contacting structure has a semispherical ground contacting surface.

15. A wheeled trimmer, comprising;
a horizontal frame with two wheels, mounted on opposite sides of the frame and near a rear end of the frame;
a motor mounted on the frame;
a handle attached to the frame and extending past the rear end of the frame at an angle for enabling a user to maneuver the trimmer while standing; and
a spindle assembly depending from a front end of the frame, wherein said spindle assembly comprises:
a shaft capable of rotating about its axis, and wherein said shaft includes a plurality of slots along an outer surface of a length of said shaft;
a locking member mounted within a second frame for rotation with said shaft, wherein said locking plate operates to selectively engage any one of a said plurality of slots for positioning said frame along a length of said shaft;
a string carrier operatively connected to the frame to rotate with said shaft, wherein said string carrier includes a cutting filament and rotates with said shaft thereby causing trimming of vegetation, and whereby by engaging said locking plate with one of said plurality of slots the distance of said cutting filament from the ground can be adjusted; and
a ground contacting structure, wherein said ground contacting structure is attached to an end of said shaft for rotation about the axis of said shaft independently of said shaft, wherein the ground contacting structure includes a semispherical surface portion for contacting the ground.

* * * * *